(12) United States Patent
Thommana et al.

(10) Patent No.: US 11,490,452 B2
(45) Date of Patent: Nov. 1, 2022

(54) AD-HOC HF TIME FREQUENCY DIVERSITY

(71) Applicant: Rockwell Collins, Inc., Cedar Rapids, IA (US)

(72) Inventors: John Thommana, Cedar Rapids, IA (US); Timothy E. Snodgrass, Palo, IA (US); Syed A. Ahmed, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1 day.

(21) Appl. No.: 16/747,335

(22) Filed: Jan. 20, 2020

(65) Prior Publication Data

US 2021/0227626 A1   Jul. 22, 2021

(51) Int. Cl.
*H04B 7/22* (2006.01)
*H04W 84/18* (2009.01)
*H04B 7/06* (2006.01)
*H04B 7/155* (2006.01)
*H04W 72/04* (2009.01)
(Continued)

(52) U.S. Cl.
CPC ............. *H04W 84/18* (2013.01); *H04B 7/06* (2013.01); *H04B 7/15585* (2013.01); *H04B 7/15592* (2013.01); *H04W 72/0446* (2013.01); *H04W 72/082* (2013.01); *H04W 74/0808* (2013.01)

(58) Field of Classification Search
CPC ............. H04W 84/18; H04W 74/0808; H04W 72/082; H04W 72/0446; H04B 7/15592; H04B 7/06; H04B 7/15585
See application file for complete search history.

(56) References Cited

U.S. PATENT DOCUMENTS

| 7,626,966 B1 | 12/2009 | Ruiter et al. |
| 8,089,887 B2 | 1/2012 | Lippman et al. |
| 8,139,624 B1 | 3/2012 | Snodgrass |

(Continued)

FOREIGN PATENT DOCUMENTS

| EP | 2407003 B1 | 2/2016 |
| EP | 2777359 B1 | 10/2016 |
| WO | 2019070842 A2 | 4/2019 |

OTHER PUBLICATIONS

Extended Search Report for European Application No. 21152588.6 dated Jun. 28, 2021, 10 pages.

*Primary Examiner* — Hashim S Bhatti
(74) *Attorney, Agent, or Firm* — Suiter Swantz pc llo

(57) ABSTRACT

A high-frequency beyond line of sight ad-hoc communication system is disclosed. In embodiments, the system includes an originating node. The originating node is configured to transmit a transmission. In, the system includes a destination node. The destination node is configured to receive the transmission using one or more antennas. In, the system includes one or more relay nodes, which are configured to relay the transmission from the operating mode to the destination mode in a time diverse manner. The relay nodes further comprise a controller, configured to facilitate high-frequency beyond line of sight communication between the originating node and the destination node, wherein the transmission is carried in accordance with a TDMA based waveform that supports frames and time slots. In embodiments, the one or more relay nodes are further configured to relay the transmission from the originating mode to the destination mode in a frequency diverse manner.

16 Claims, 12 Drawing Sheets

(51) Int. Cl.
  *H04W 72/08*   (2009.01)
  *H04W 74/08*   (2009.01)

(56) References Cited

U.S. PATENT DOCUMENTS

| | | | |
|---|---|---|---|
| 9,282,500 | B1 | 3/2016 | Thommana et al. |
| 10,116,382 | B1* | 10/2018 | Thommana .............. H04B 7/22 |
| 2006/0209892 | A1* | 9/2006 | MacMullan .......... H04W 12/08 |
| | | | 370/468 |
| 2008/0175183 | A1* | 7/2008 | Devroye ................ H04B 7/022 |
| | | | 370/315 |
| 2008/0240018 | A1* | 10/2008 | Xue .................. H04W 72/1231 |
| | | | 370/328 |
| 2012/0294384 | A1* | 11/2012 | Wilcoxson ......... H04B 7/18586 |
| | | | 375/285 |
| 2013/0176905 | A1 | 7/2013 | Haverty |
| 2014/0098718 | A1* | 4/2014 | Powell, III .......... H04W 72/085 |
| | | | 370/279 |
| 2014/0307633 | A1 | 10/2014 | Soulie |
| 2016/0070001 | A1* | 3/2016 | Krantz .................... G01S 19/32 |
| | | | 342/357.72 |
| 2016/0197669 | A1* | 7/2016 | Babich ..................... H04B 7/22 |
| | | | 370/315 |
| 2019/0173567 | A1* | 6/2019 | Jalali ................... H04W 72/044 |
| 2019/0190569 | A1* | 6/2019 | Nayeb Nazar ....... H04B 7/0417 |
| 2021/0007008 | A1* | 1/2021 | Gage ................... H04W 28/065 |

* cited by examiner

AD-HOC HF TIME FREQUENCY DIVERSITY

BACKGROUND

Ad hoc high frequency communication systems may be utilized to provide beyond line of sight high frequency (HF) radio frequency communications in various types of operating conditions. These HF communication systems are typically configured to handle two nodes in communication using traditional HF contention-based waveforms. These nodes are typically configured to keep track of other potential nodes during idle periods and use the potential nodes if the current communication link breaks. It is noted that if other nodes are used, those nodes will typically retransmit the transmission with the same control parameters as the originating node. It is also noted that there are performance issues associated with existing ad hoc HF communication systems.

SUMMARY

A high-frequency beyond line of sight ad-hoc communication system is disclosed. In one or more embodiments, the system includes an originating node. The originating node is configured to transmit a transmission. In one or more embodiments, the system includes a destination node. The destination node is configured to receive the transmission using one or more antennas. In one or more embodiments, the system includes one or more relay nodes. The one or more relay nodes are configured to relay the transmission from the operating mode to the destination mode in a time diverse manner. The one or more relay nodes further comprise a controller. The controller is configured to facilitate high-frequency beyond line of sight communication between the originating node and the destination node, wherein the transmission is carried in accordance with a time division multiple access (TDMA) based waveform that supports frames and time slots.

In some embodiments of the system, the one or more relay nodes are further configured to relay the transmission from the originating mode to the destination mode in a frequency diverse and/or a spatially diverse manner.

A high-frequency beyond line of sight ad-hoc communication system is disclosed. In one or more embodiments, the system includes an originating node. The originating node is configured to transmit a transmission. In one or more embodiments, the system includes a destination node. The destination node is configured to receive the transmission using one or more antennas. In one or more embodiments, the system includes one or more relay nodes. The one or more relay nodes are configured to relay the transmission from the operating mode to the destination mode in a frequency diverse manner. The one or more relay nodes further comprise a controller. The controller is configured to facilitate high-frequency beyond line of sight communication between the originating node and the destination node, wherein the transmission is carried in accordance with a time division multiple access (TDMA) based waveform that supports frames and time slots.

In some embodiments of the system, the one or more relay nodes are further configured to relay the transmission from the originating mode to the destination mode in a time diverse and/or a spatially diverse manner.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
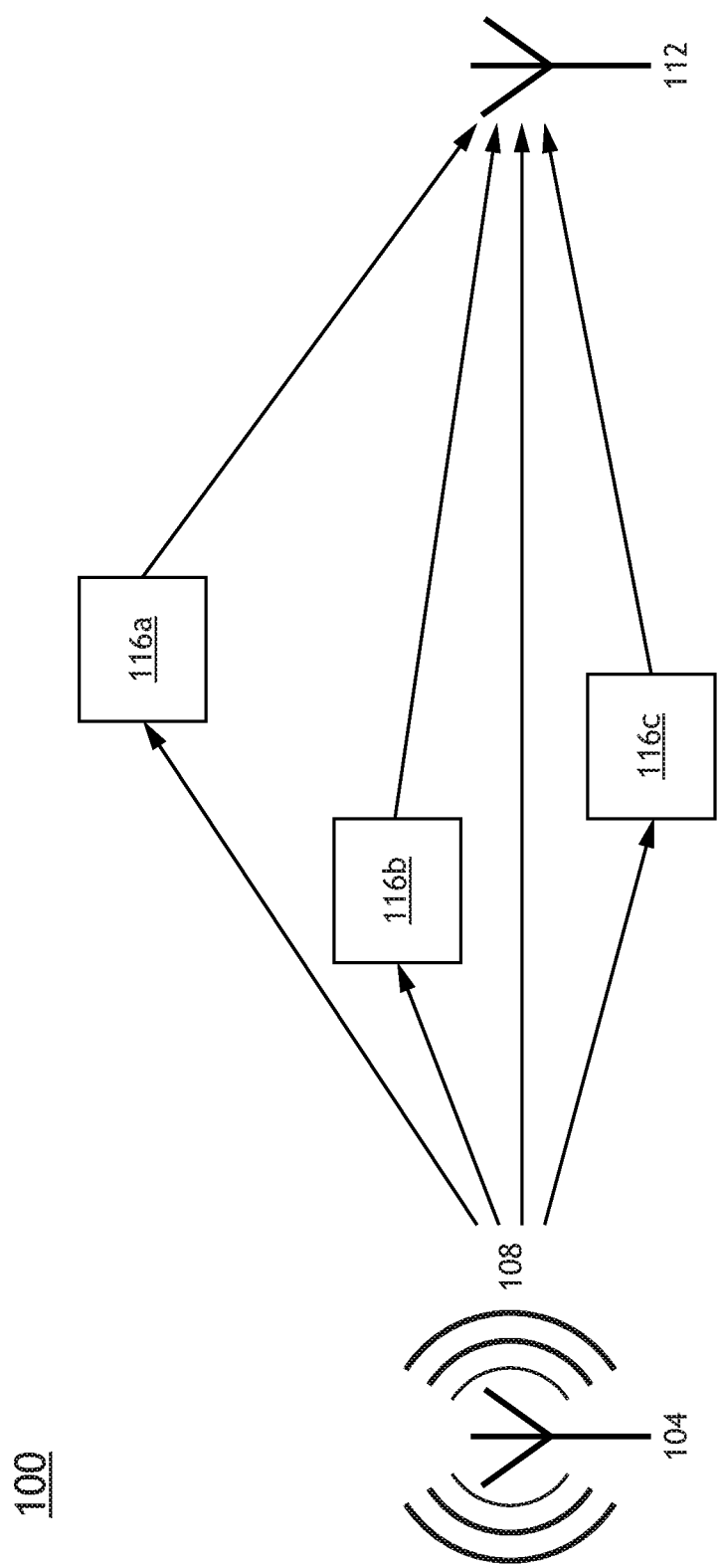
FIG. 1A is a diagram depicting a communication system in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Embodiments of the inventive concepts here are directed to high frequency (HF) communication systems capable of supporting HF tactical communications using relay nodes utilizing a single transmitter, and destination nodes capable of diversity reception while using a single antenna, the relay nodes cooperatively simulating a multiple input single output (MISO) or multiple input multiple output (MIMO) communication system.

Traditionally, HF communications used in low-angle skywave systems were organized as point-to-point systems (e.g., no relays), while HF communications using near vertical incidence skywave (NVIS), ground wave or sea wave signals could be networked using a single frequency. Recently, ad hoc HF networks using low-angle beyond-line-of-sight (BLOS) signals have been developed, as described in U.S. Pat. No. 10,116,382 entitled "Ad Hoc High Frequency Network", filed Feb. 24, 2017 and U.S. Pat. No. 9,282,500 entitled "Ad Hoc High Frequency with Advanced Automatic Link Establishment System and Related Method", filed Jun. 18, 2014, which are both hereby incorporated by reference in their entirety). These references disclose the networking of HF nodes using low-angle skywaves, where all of the nodes may be at geographically separated locations such that all nodes cannot communicate on a single frequency. These networks use TDMA schemes, assigning time slots when nodes can listen to other nodes to determine their availability to participate in the network. This form of HF network, which is not preplanned, is referred to as an ad hoc HF network.

The communication systems and methods configured in accordance with embodiments of the inventive concepts disclosed herein may utilize a robust mesh networking waveform. In some embodiments, the waveform may be a time division multiple access (TDMA) based waveform that supports time slots. The time slots can be allocated to users statically and/or dynamically for different purposes, including transmissions of data, voice, situational awareness, network management, as well as other overhead information. It is noted that a TDMA based waveform (e.g., which has the concept of time slots, groups of slots referred to as frames, and groups of frames referred to as epochs) is different from a conventional point to point contention-based waveform (e.g., which does not depend on the knowledge of time). It is contemplated that a TDMA based waveform may be better suited to support a large number of nodes, and that many of these nodes may be used to receive and retransmit data as a relay node, provide improved efficiency, efficacy, and resource allocation compared to a conventional contention-based waveform.

FIG. 1A is a diagram depicting a communication system 100 in accordance with the inventive concepts disclosed herein. In embodiments, the communication system 100 includes an originating node 104. The originating node initially codes and transmits a transmission 108 in the communication system 100. In some embodiments, the originating node 104 transmits from high-gain antennas with powerful amplifiers (e.g., from fixed-site nodes or maritime nodes with 1 kW to 10 kW capabilities). In some embodiments, power constrained systems may be used as the originating node (e.g., vehicular, airborne or other mobile platforms).

In embodiments, the communication system 100 further includes a destination node 112. The destination node 112 is the intended receiver of the transmission 108, where it both receives and decodes the transmission 108. In some embodiments, the destination node 112 is a single antenna capable of receiving multiple channels simultaneously. For example, the destination node 112 may be a single antenna receiver capable of receiving multiple transmissions that have been transmitted using different power levels (e.g., through successive interference cancellation as described herein). In another example, the destination node 112 may be a single antenna receiver capable of receiving up to six channels simultaneously (e.g., up to six different frequencies within the maximum and least usable frequency (MUF/LUF)). These receivers utilize one or more processors (e.g., FPGA, SoC, or IC) to process (e.g., digitize) incoming signals. In some embodiments, the multi-frequency receivers are also capable of decoding several slot bursts per frame.

In some embodiments, the destination node 112 is a wideband HF receiver. In some embodiments, the destination node 112 is a wide band HF receiver along with a traditional HF receiver. For example, the wideband HF receiver may receive and digitize the entire spectrum, allowing reception of a single frequency or multiple frequency by the traditional HF receiver.

In some embodiments, the communication system 100 includes one or more relay nodes 116*a-c*. The relay nodes 116*a-c* are configured to opportunistically receive a transmission from the originating node 104 and retransmit the transmission 108 to the destination node 112.

Figure 1B:
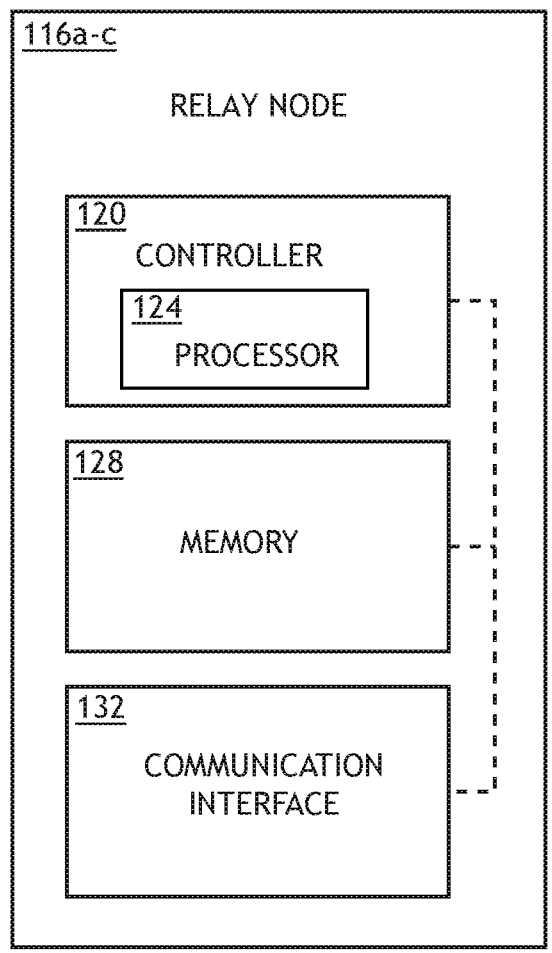
FIG. 1B is a block diagram illustrating a controller for a relay node, in accordance with one or more embodiments of this disclosure.

In some embodiments, the relay nodes 116*a-c* include a controller 120. FIG. 1B is a block diagram illustrating a controller 120 for a relay node 116*a-c*, in accordance with one or more embodiments of this disclosure. The controller 120 provides processing functionality for the relay node and can include any number of processors 124. The one or more processors 124 may include any processors 124 used in the art including, but not limited to, field programmable gate arrays (FPGA), and application-specific integrated circuits (ASIC). The controller may utilize the one or more processors 124 to receive and decode incoming transmissions and recode and retransmit the relayed transmissions. The controller may also include resident or external memory 128 for storing data, executable code, and other information accessed or generated by the relay node 116. The controller 120 can execute one or more software programs embodied in a non-transitory computer readable medium (e.g., a memory 128) that implements techniques described herein. The controller 120 is not limited by the materials from which it is formed or the processing mechanisms employed therein.

The memory 128 can be an example of a tangible, computer-readable storage medium that provides storage functionality to store various data and/or program code associated with operation of the relay node 116 and or controller 120, such as software programs and/or code segments, or other data to instruct the controller 120, and possibly other components of the relay node 116. The memory 128 can store data, such as a program of instructions for operating the relay node 116 and/or incoming data from the transmission 108. It should be noted that while a single memory 106 is described, a wide variety of types and combinations of memory 128 (e.g., tangible, non-transitory memory) can be employed. The memory 128 can be integral with the controller 104, can comprise stand-alone memory, or can be a combination of both. Some examples of the memory 128 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the relay node includes a communication interface 132. The communication interface man be operatively configured to communicate with the components of the relay node 116 and the controller 120. For example, the communication interface 132 can be configured to retrieve data from the controller 120 or other devices, transmit data for storage in memory 128, retrieve data from storage in memory, 128 and so forth. The communication interface 108 can also be communicatively coupled with the controller 120 to facilitate data transfer between components of the relay node 116 and the controller 120. It should be noted that while the communication interface 132 is described as a component of the relay node 128, one or more components of the communication interface 132 can be implemented as external components communicatively coupled to the relay node 116 via a wire and/or wireless connection. The relay node 116 may also include and/or connect to one or more input/output (I/O) devices. In embodiments, the communication interface 132 includes or is coupled to a transmitter, receiver, transceiver, physical connection interface, or any combination thereof.

In some embodiments, the relay nodes 116*a-c* are selected to reduce the time of transmission and/or increase the data rate of a transmission of a signal that would have originally been transmitted without a relay. In some embodiments, the relay nodes 116*a-c* are selected to increase the robustness of a signal that would have originally been transmitted without a relay (e.g., through a multipath strategy).

In some embodiments, the relay node 116 may be or have been performing as a node in a separate communication system (e.g., acting as an originating, destination or relay node). In this situation, the originating node 104 contacts the relay node 116 to determine if the relay node 116 can assist in relaying a transmission 108 to the destination node 112. The ability of the opportunistic relay node 116 to assist the originating node 104 in relaying the transmission 108 may depend on several parameters including, but not limited to, the authority level of the originating node 104, the importance of the transmission 108, the transmission schedule of the relay node 116, and the probability of successfully retransmitting the transmission 108 to the destination node 112 than the originating node. Once the relay node 116 has acknowledged the ability to retransmit a transmission 108 to the destination node 112, the originating node 104 will begin transmitting the transmission 108 to the relay node 116.

FIG. 1 presents three relay nodes 116*a-c* in the communication system 100. The number of relay nodes 116*a-c* may vary between different communication systems 100. For instance, a communication system 100 may contain one relay node 116*a*. In another example, a communication system may contain 10 relay nodes 116*a-c*. In still another example, a communication system may contain 264 relay nodes.

In embodiments, relay nodes may consist of power constrained airborne, vehicular, or other mobile units (e.g., less than 1 kW). However, larger fixed site nodes or maritime nodes may also be used as a relay node, therefore the above description should not be interpreted as a limitation of the present disclosure, but merely an illustration.

In embodiments, the communication system 100 takes advantage of spatial diversity to ensure that the transmission 108 reaches the destination node 112. Spatial diversity is a cooperative communication method where relays located at varied geographical points are used to relay the same transmission 108 from the originating node 104 to the destination node 112. For example, relay node 116*a*, geographically located a distance from both the originating node 104 and destination node 112, is able to receive the transmission 108 from the originating node and retransmit the transmission to the destination node. Similarly, geographically separated relay nodes 116*b* and 116*c* are also able to receive the transmission 108 from the originating node 104 and retransmit the transmission to the destination node. Having multiple relay nodes 116*a-c* receiving and retransmitting the same transmission 108 increases the probability that the entirety of the transmission will successfully reach the destination node 112.

Figure 2A:
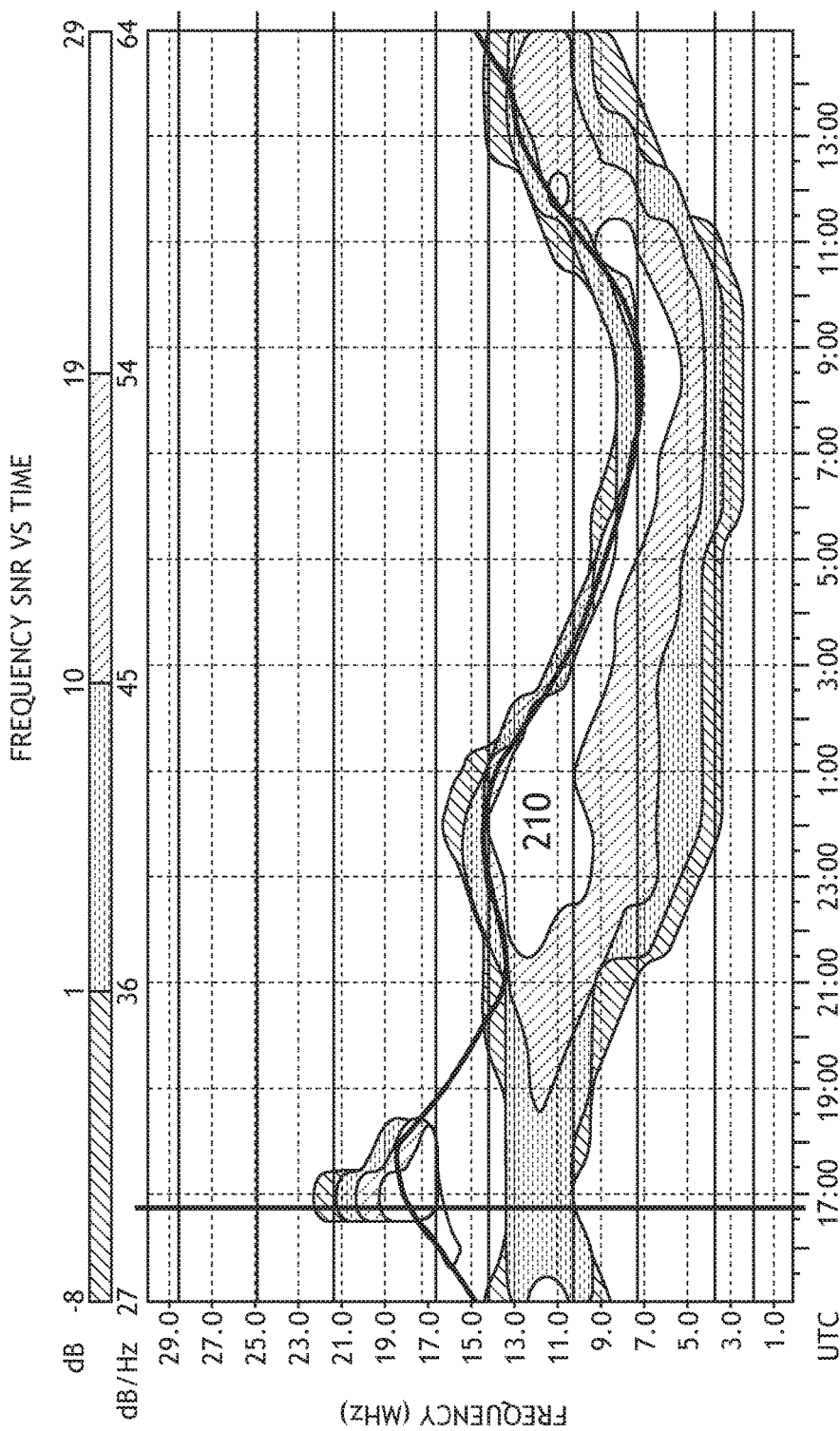
FIG. 2A is a graph showing the prediction of propagation of HF signals from Node B to Node A, in accordance with one or more embodiments of this disclosure.

An example embodiment of cooperative communication through spatial diversity using relay nodes 116*a-c* are shown in FIGS. 2A-2D. In this example, a transmission is planned to be sent from an originating node 112 in Node A to the destination node 116 at Node B. FIG. 2A is a graph 200 showing the prediction of propagation of HF signals from Node A to Node B, in accordance with one or more embodiments of this disclosure. Competent propagation of a HF signal requires high signal-to-noise (SNR) ranges that vary with time. Operators use automatic link establishment (ALE) protocols to determine the highest data rate that can be supported by current SNR conditions, as SNR can vary drastically depending on the time of day. For instance, if a transmission were to occur between UTC 1600 and 1900 at 11 MHz, the SNR from node A to node B would range from a paltry 1 dB to 10 dB. Under these conditions (e.g., 10 dB SNR), a 3 kHz bandwidth can deliver 2400 bps. However, the SNR improves later in the day. In another instance, from UTC 2130 to 1130, the maximum SNR 210 is predicted to be between 19 dB and 29 dB in a 3 kHz bandwidth, which can support data transmission at 16000 bps. It is noted that in order to transmit under maximal SNR 210, the frequencies used in the transmission will need to vary, requiring the originating node to vary the frequency at the appropriate time. Overall, the window of the maximal SNR 210 is rather narrow for a transmission to be sent from Node A to Node B with a high bit rate (e.g., over 20000 bps).

Figure 2B:
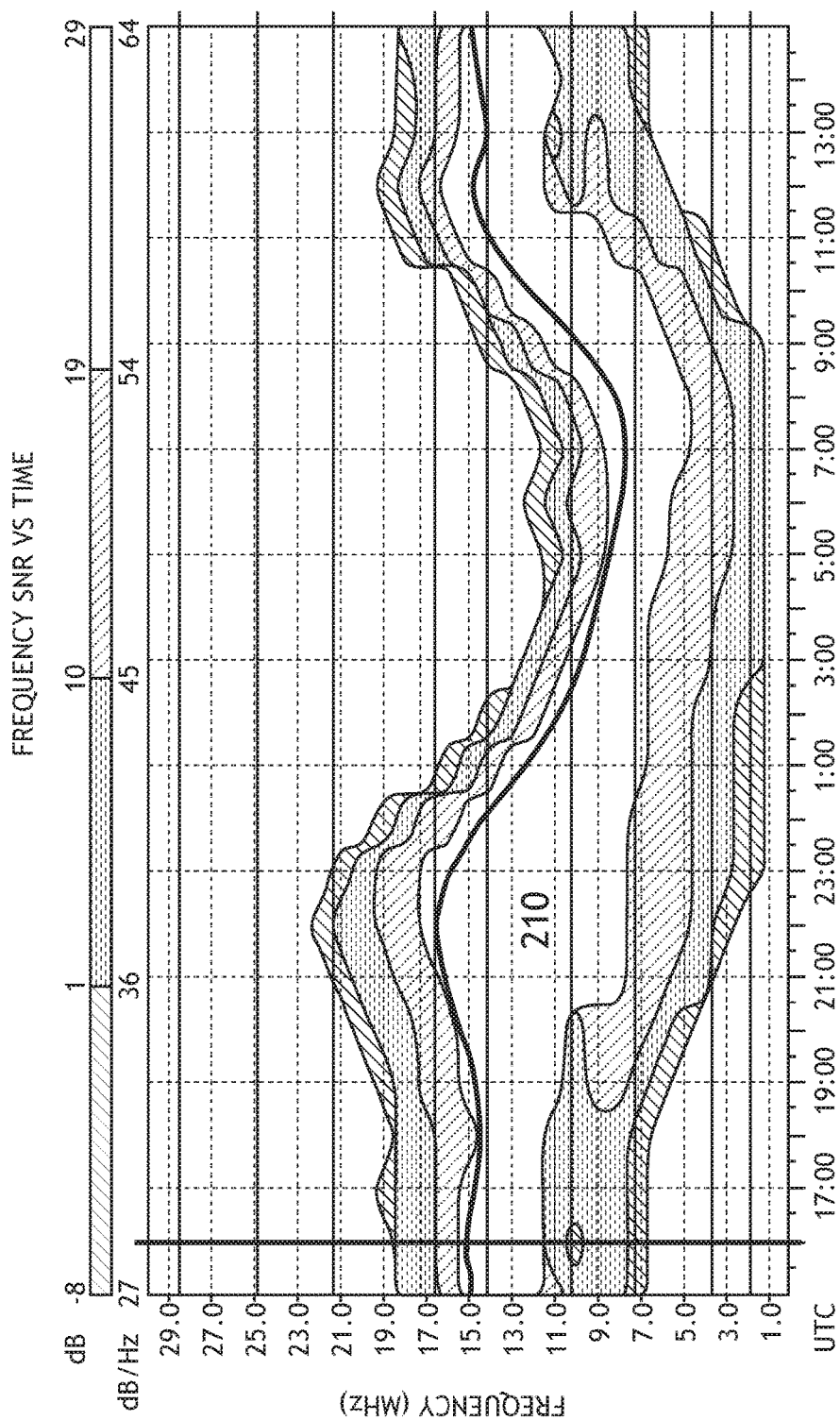
FIG. 2B is a graph showing the prediction of propagation of HF signals from Node B to Node C, in accordance with one or more embodiments of this disclosure.

FIG. 2B is a graph showing the prediction of the propagation of HF signals from Node A to Node C, in accordance with one or more embodiments of this disclosure. The predicted SNR for Node A to Node C propagation is generally higher than in the Node A to Node B prediction, with the maximal SNR 210 ranging from 25 dB to 37 dB, versus 19 dB to 29 predicted SNR for Node A to Node B. The window of the maximal SNR 210 is also considerably broader. At points where the SNR is approximately 37 dB, a wider channel of 9 kHz can be used, allowing data throughputs of 48000 bps. By selecting a relay node 116 within the communication system 100, performance is maximized and radio traffic is routed automatically over multiple hops without operator intervention, offering a considerable advantage over direct linking.

Figure 2C:
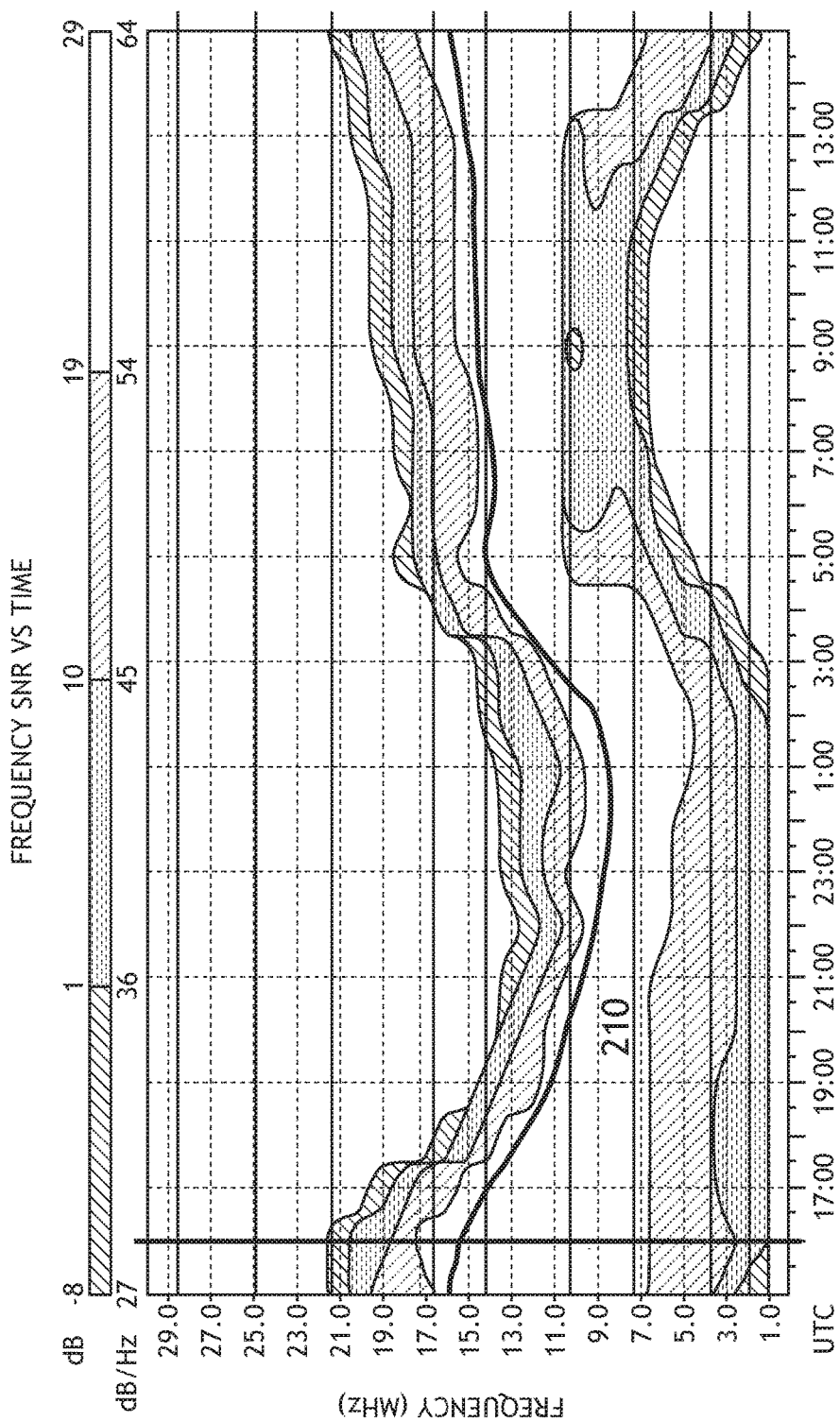
FIG. 2C is a graph showing the prediction of propagation of HF signals from Node C to Node A, in accordance with one or more embodiments of this disclosure.

FIG. 2C is a graph showing the prediction of the propagation of HF signals from Node B to Node C, in accordance with one or more embodiments of this disclosure. Similar to the predicted propagation for Node A to Node C in FIG. 2B, the SNR has a high quartile of predicted SNR ranges (e.g., 28 dB to 40 dB) and a broad window of maximal SNR 210 that runs continuously through the day, allowing data throughputs of 48000 bps. The high SNR values shown in FIGS. 2B and 2C suggest that Node C could act as a relay node for a transmission from Node A to Node B with an overall greater bit rate than what would be possible for a direct communication between Node A and Node B.

Figure 2D:
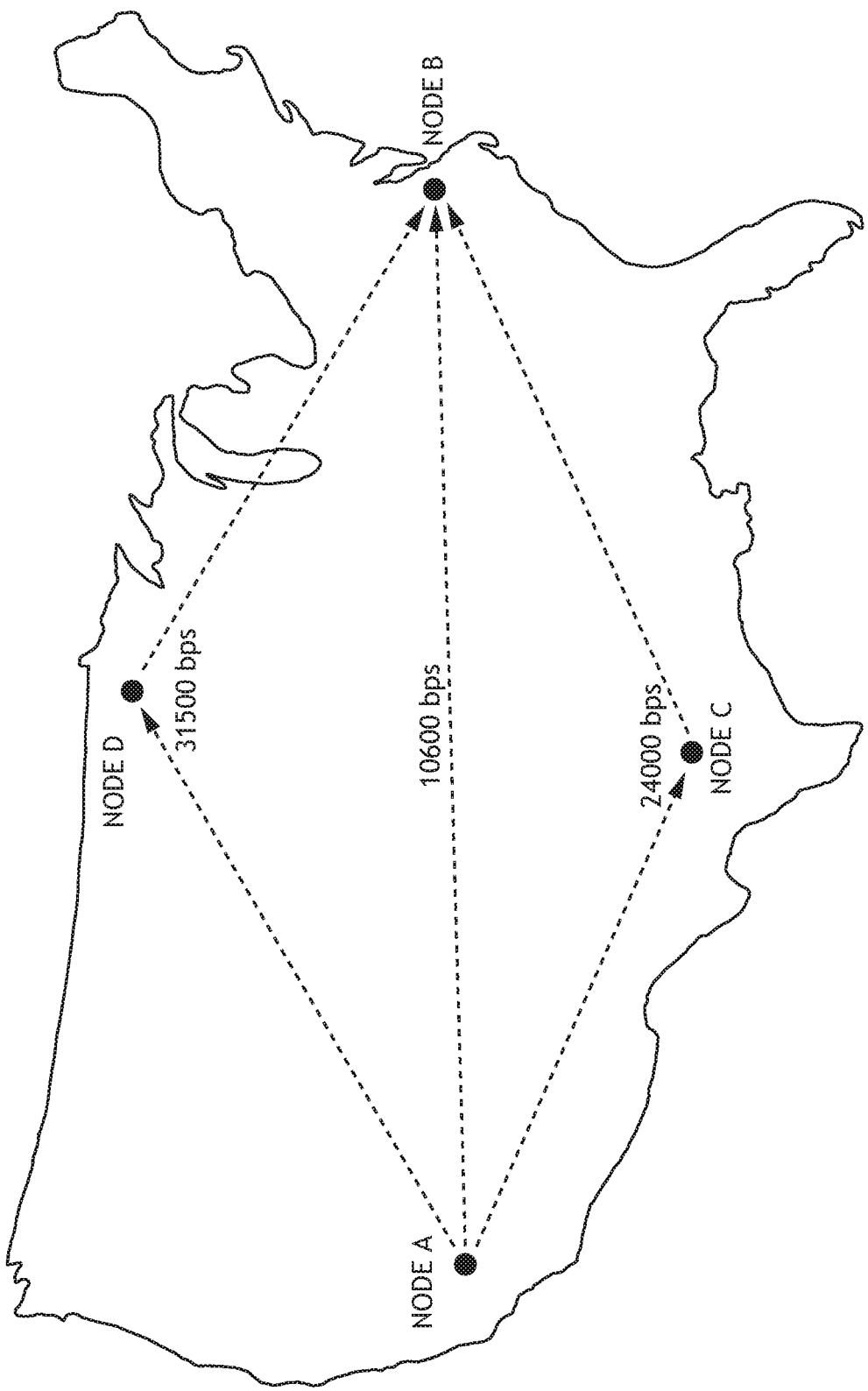
FIG. 2D is a map of the contiguous United States showing possible routes of a HF transmission from Node A to Node B, in accordance with one or more embodiments of this disclosure.

FIG. 2D is a map of the contiguous United States showing possible routes of a HF transmission from Node A to Node B, in accordance with one or more embodiments of this disclosure. One of the possible routes for transmission is a direct hop from Node A to Node B, as referred to in FIG. 2A. The low predicted SNR for this route also predicts a low average bit rate of 10600 bps. Using Node C as a relay, which has a higher predicted SNR for both Node A to Node C transmissions and Node B to Node C transmissions, a greater average predicted bit rate of 24000 bps is calculated.

A similar increase in average predicted bit rate is seen when considering a second relay node 116 at Node D. When predictions for HF propagation of Node A to Node D transmissions and Node D to Node B transmissions were determined, an overall bit rate bit rate of 31500 bps was predicted for a transmission from Node A to Node B using Node D as a relay node. Therefore, the use of either Node C or Node D as a relay node is predicted to more than double the bit rate of a direct transmission between Node A and Node B.

The ability to utilize a different transmission route to increase transmission efficiency is referred to as spatial diversity. Spatial diversity allows an operator to choose a path around atmospheric disturbances, jamming devices, and other interfering phenomena. By taking advantage of available spatially diverse relay nodes, further increases in transmission efficiency can be seen by sending the same transmission through multiple paths (e.g., each using one or more relay nodes) in a cooperative communication scheme.

Selecting multiple relays to transmit simultaneously on the same frequency transforms the relay channel into a Multiple Input Single Output (MISO) like channel, which has the benefit of reducing the required SNR by a factor proportional to $1/SNR^L$, where L is the number of relays. For example, in referring to FIG. 2D, sending the same transmission through Node A and Node B decreases the outage probability for the transmission than if only one path were used. In another example, up to six relay nodes 116 may opportunistically receive a transmission 108 and retransmit the transmission 108 towards the destination node 112. In this instance, using six relay nodes 116 reduces the outage probability below 0.5%. In another example, the utilization of three relays reduces the average required SNR by approximately 10 dB. This 10 dB reduction can substantially increase bit rates in a transmission. For instance, whereas a transmission occurring in an SNR of 39 dB may allow transmission of 48000 bps in a 9 kHz channel, and additional 10 dB would allow a transmission of 76800 bps in a 15 kHz channel or 90000 bps in an 18 kHz channel. By using relay nodes 116, the transmission 108 is transmitted at a higher throughput (e.g., with greater capacity) than can be sustained individually for a given available SNR.

Increased throughput of spatial diversity transmissions may be achieved by partitioning the transmission between two or more nodes 116. For example, referring to FIG. 1, nodes 116a and 116b may transmit the even packets of a transmission, whereas node 116c (e.g., and possibly another node 116) transmits the odd packets of the same transmission. In this example, the advantages of signal diversity are seen (e.g., increased probability of reception) along with a reduction of overall transmission time.

It is important to note that the relay nodes 116 in the communication system 100 need only one antenna to receive and retransmit a transmission. The destination node 112 may also necessitate only one antenna if the signals from more than one relay nodes arrive instantaneously. In general, legacy HF and WBHF receivers are not capable of diversity reception. However, non-instantaneous transmission (e.g., through latency of the relay protocol or spatial delays) require diversity reception capability (e.g., HFGCS receivers, triple diversity receivers, and other multichannel receivers). Alternatively, control information sent from the originating node 104 may be exchanged between multiple relay nodes 116 that permit periodical time alignment of the relay node transmissions, permitting the transmissions 108 that are sent from the relay nodes 116 to arrive at the destination node 112 simultaneously, allowing reception by legacy HF and WBHF receivers.

In some embodiments, the relay nodes 116 of the communication system 100 are configured to use collaborative signal processing (CSP). Using CSP, along with ensuring that the required power and/or SNR differential between relay nodes and the destination node is established, successive interference modulation (SIC) may be used to isolate and decode simultaneously arriving packets by demodulating the strongest source based on a preamble detection metric, then canceling it out and iteratively decoding the next strongest signal. In some embodiments, SIC is used to decode more than two simultaneous packets.

Figure 3:
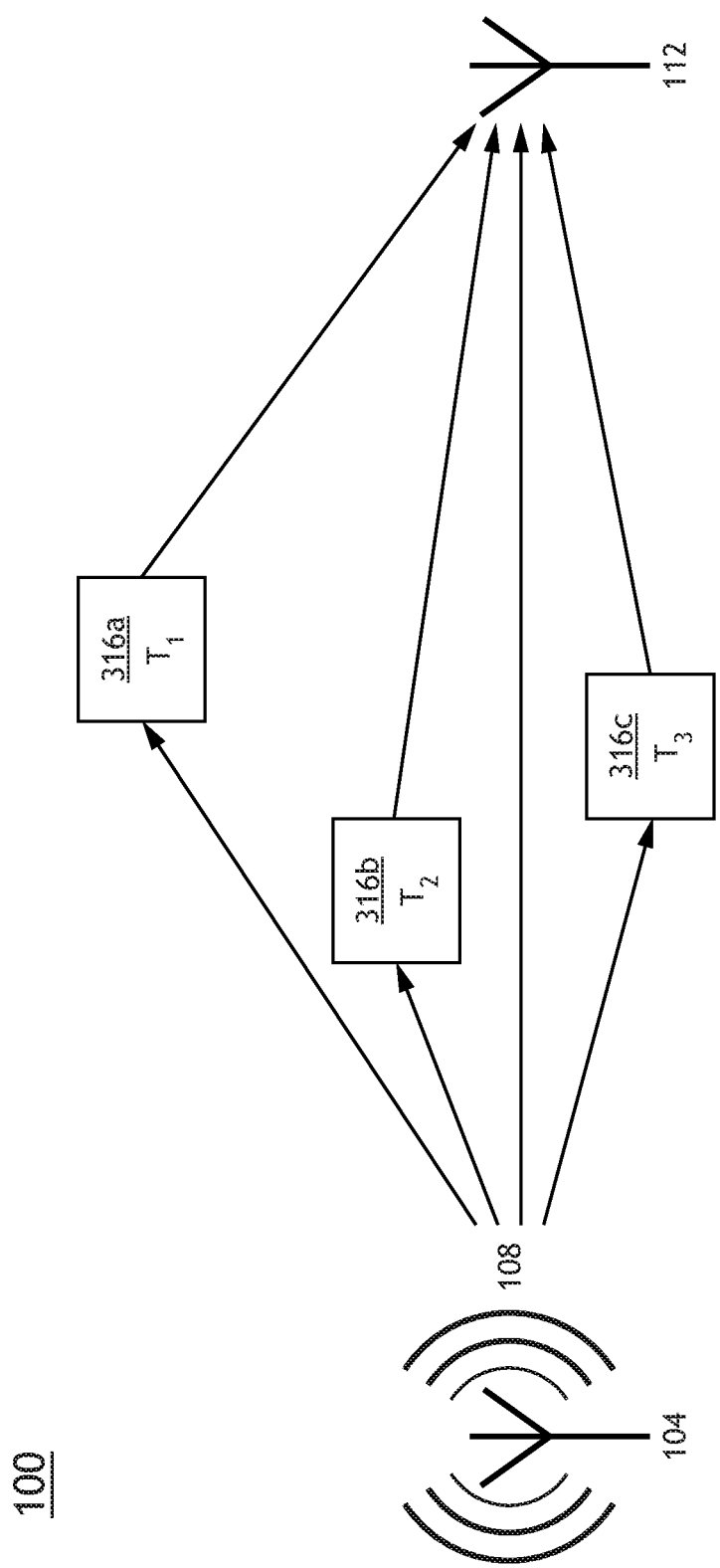
FIG. 3 is a diagram depicting a communication system configured for single frequency transmit diversity relaying, in accordance with one or more embodiments of this disclosure.

The advantage of using of diversity-capable receivers with non-instantaneous transmissions sent from relay nodes 116 over instantaneous transmission is substantial. For example, a lightning strike in the vicinity of the destination node lasting 30 milliseconds (ms) may interfere with 30 ms of transmission, preventing the entire transmission from being received and decoded. Having a diversity of transmission spread over time allows multiple copies of the transmission to be received by the receiver. Sections of one transmission lost to the lightning strike may be regained by comparing the transmission 108 to another transmission 108 with a different time characteristic. By comparing multiple transmissions 108, a complete transmission 108 may be received and decoded. FIG. 3 is a diagram depicting a communication system 100 configured for single frequency transmit diversity relaying, in accordance with one or more embodiments of this disclosure. In this communication system 100, the originating node 104 transmits a transmission 108 to one or more relay nodes 316a-c. Each relay node 316a-c may incorporate one or more unique time delays (e.g., $T_1$, $T_2$, and $T_3$) that alters the time that the retransmission will reach the destination node 112. The time delay may be the result of multiple factors, including but not limited to, time delays purposefully set through instruction control data, spatial distances between nodes, and the latency of the relay node to receive and retransmit transmission. These time delays are coordinated so that the multiple relayed transmissions do not interfere with each other. The destination node 112 may then receive and decode retransmissions from one or more of the relay nodes 316a-c.

Relay nodes 116 are also capable of receiving transmissions with one frequency, then retransmitting the message with a different frequency. For example, a relay node 116 may change the frequency of the transmission to one that is suboptimal for interference by jamming devices that may be used between the relay node 116 and the destination node 112. Using multiple frequencies may also overwhelm a jammer's capabilities. For instance, six relays retransmitting the same transmission on six different frequencies would require the jammer to either dedicate ⅙ of power resources to jam each frequency, or divide power resources unequally, reducing interference in some channels. In another example, a relay node 116 may change the frequency of a transmission to one that is less affected by adverse SNR levels. For instance, in the graphs shown in FIGS. 2B and 2C, an 11 MHz transmission send from Node A at 0600 UTC to Node C would have an advantageous SNR range and capabilities to transmit at a high bit rate. However, retransmitting the transmission to Node B at the same frequency with the same high bit rate is not possible due to the lower SNR range at that time. By retransmitting at a different frequency (e.g., 6 to 8 kHz) that has a higher SNR range, the transmission may be retransmitted at the same bit rate. Alternatively, having both Node C and Node D act as frequency optimizing relay nodes would further optimize the probability and efficiency of transmission reception.

Figure 4:
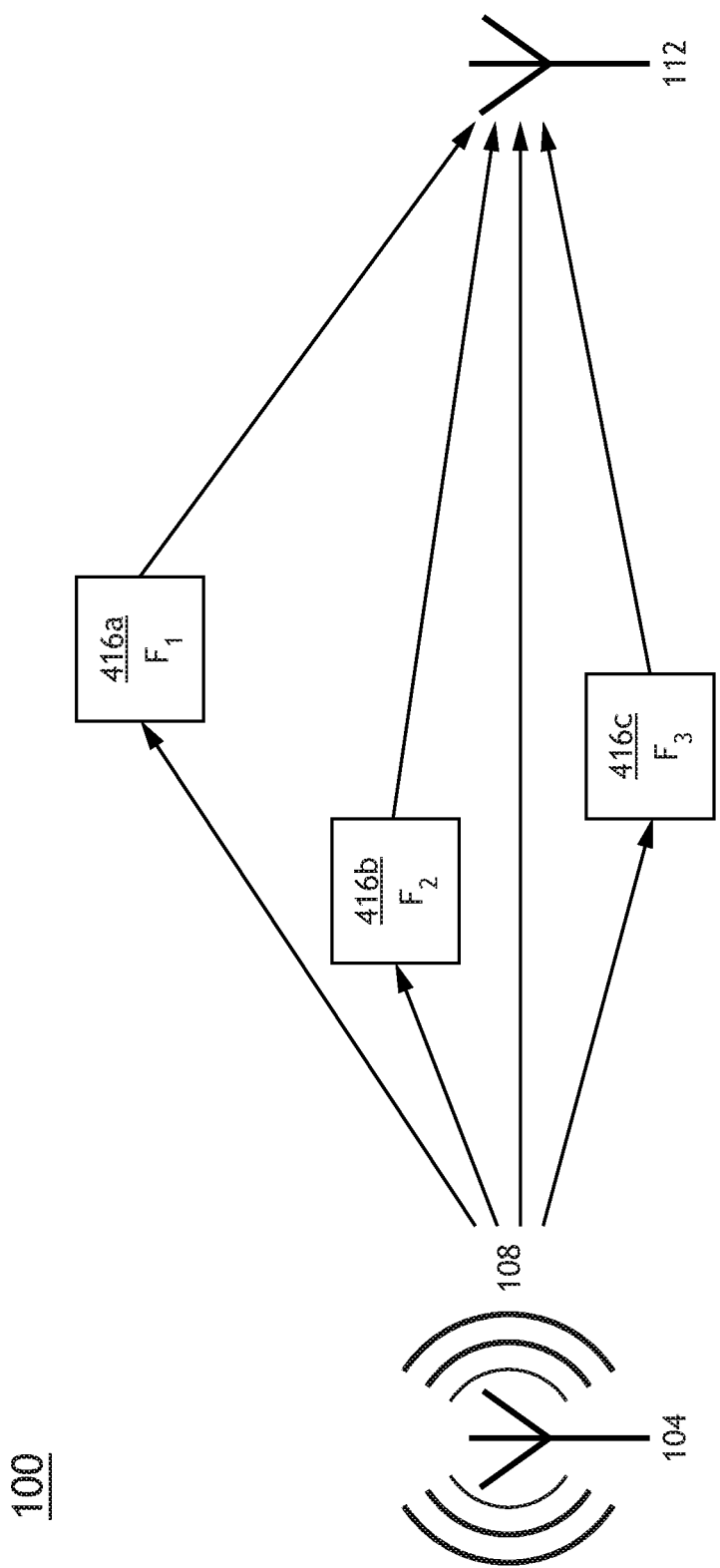
FIG. 4 is a diagram depicting a communication system configured for multiple frequency transmit diversity relaying, in accordance with one or more embodiments of this disclosure.

FIG. 4 is a diagram depicting a communication system 100 configured for multiple frequency transmit diversity relaying, in accordance with one or more embodiments of the disclosure. In this communication system 100, the originating node 104 transmits a transmission 108 to one or more relay nodes 416a-c. Each relay node 416a-c may alter the frequency upon retransmission (e.g., to frequencies $F_1$, $F_2$, and/or $F_3$), where the retransmission may be received and decoded by a destination node capable of frequency diversity reception.

Figure 5:
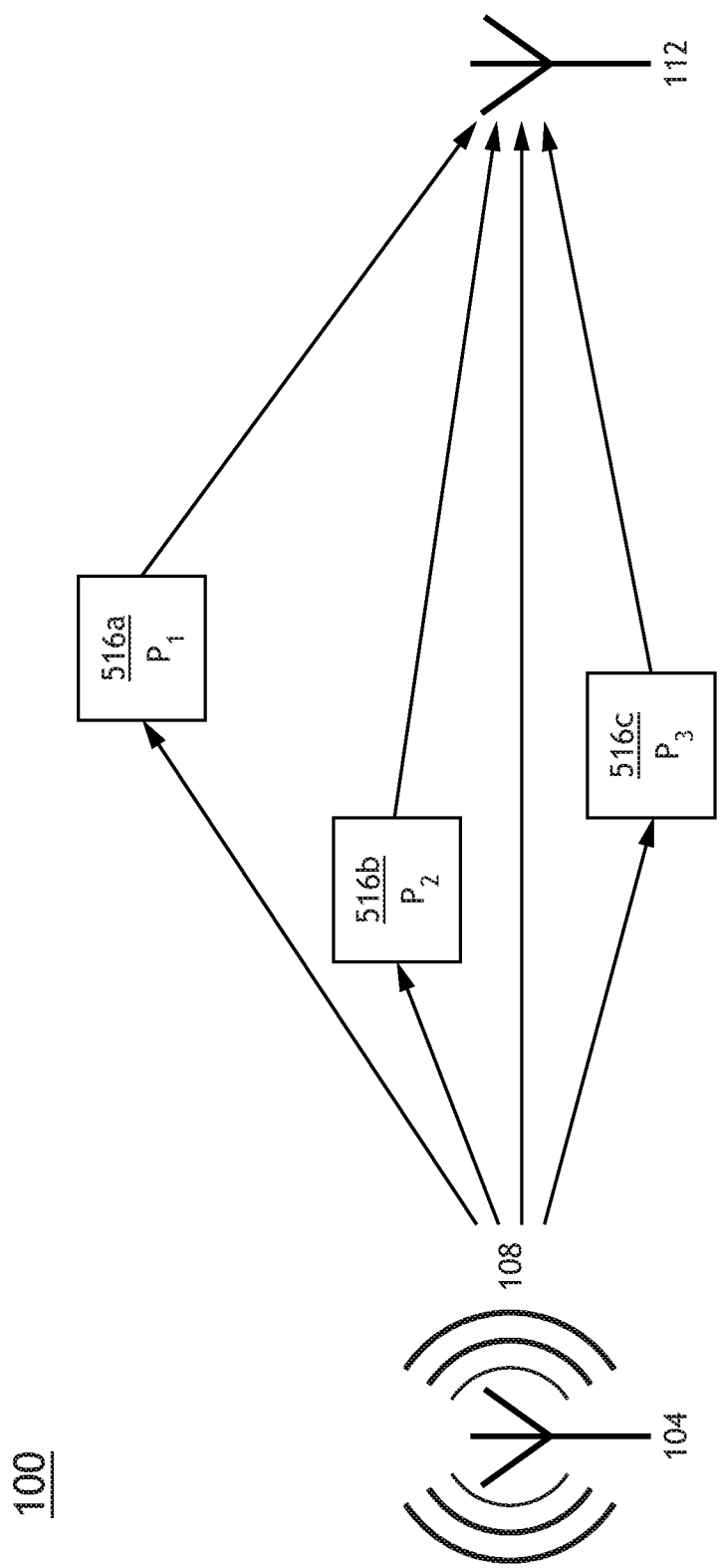
FIG. 5 is a diagram depicting a communication system configured for polarization diversity relaying, in accordance with one or more embodiments of this disclosure.

In some embodiments, a communication system 100 may incorporate polarization diversity. For instance, one or more relay nodes 116 may relay (e.g., retransmit) a transmission 108 to the destination node 112 that has different polarization characteristics than the transmission 108 that was sent from the originating node 104 to the relay node 116. FIG. 5 is a diagram depicting the communication system 100 configured for polarization diversity, in accordance with one or more embodiments of the disclosure. In this communication system 100, the originating node 104 transmits a transmission 108 to three relay nodes 516a-c. Each relay node 516a-c may alter the polarization (e.g., polarizations $P_1$, $P_2$ and/or $P_3$) of the transmission 108 upon retransmission. For example, the polarizations of signals sent from two relays nodes 516a-b (e.g., $P_1$ and $P_2$) may be orthogonal to each other. A third relay node 516c may retransmit the transmission 108 with a polarization (e.g., $P_3$) similar to $P_1$ or $P_2$, or may utilize a separate polarization scheme. The retransmission may be received and decoded by a destination node 112 capable of polarization diversity reception. It is noted that polarization diversity may be better suited for LOS transmissions than BLOS transmissions, as ionospheric reflection of BLOS signals can cause fluctuations in polarization.

Figure 6:
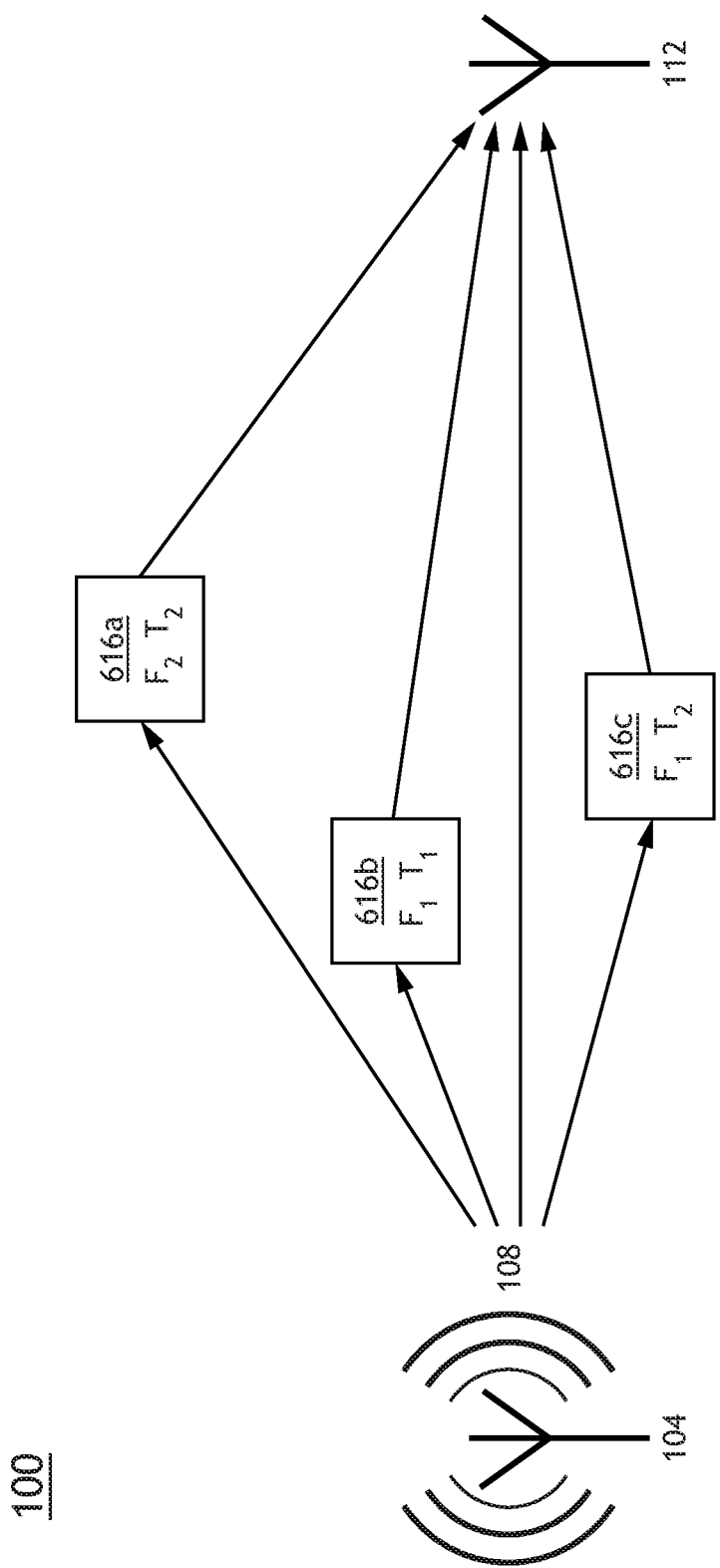
FIG. 6 is a diagram depicting a communication system configured for time delay diversity and multiple frequency transmit diversity relaying, in accordance with one or more embodiments of this disclosure.

In some embodiments, a communication system 100 may incorporate time delay diversity with multi-frequency diversity. FIG. 6 is a diagram depicting a communication system 100 configured for time delay diversity and multiple frequency transmit diversity relaying, in accordance with one or more embodiments of this disclosure. In some embodiments, the transmission 108 may also be opportunistically received and retransmitted by one or more relay nodes 616a-c in a time and frequency diverse manner. Each relay node 616a-c may alter the frequency upon retransmission (e.g., to frequencies $F_1$, or $F_2$) as well as incorporating a time delay (e.g., $T_1$, or $T_2$). The retransmitted transmission 108 is then received by a destination node 112 capable of time and frequency diversity reception. In some embodiments, the multi-channel receivers exist that receive up to six channels, simultaneously. For example, the receiver may receive a single transmission from six relay nodes 116, each at a different frequency. In another example, the receiver may receive transmissions synchronized to two time points, with each time point transmitting in three different frequencies. In a third example, the receiver may receive transmissions from synchronized to three time points, with each time point transmitting in two different frequencies. In some embodiments, spatial diversity may be incorporated into time-diverse communications, frequency-diverse communications, or time- and frequency-diverse communications. Therefore, the above description should not be interpreted as a limitation of the present disclosure, but merely as an illustration.

It should be noted that all nodes described within embodiments of the communication system 100 may possesses at least one of a controller 120, a memory 128, a processor 124 or a communication interface 132. Therefore, the above description should not be interpreted as a limitation, but merely as an illustration.

Figure 7:
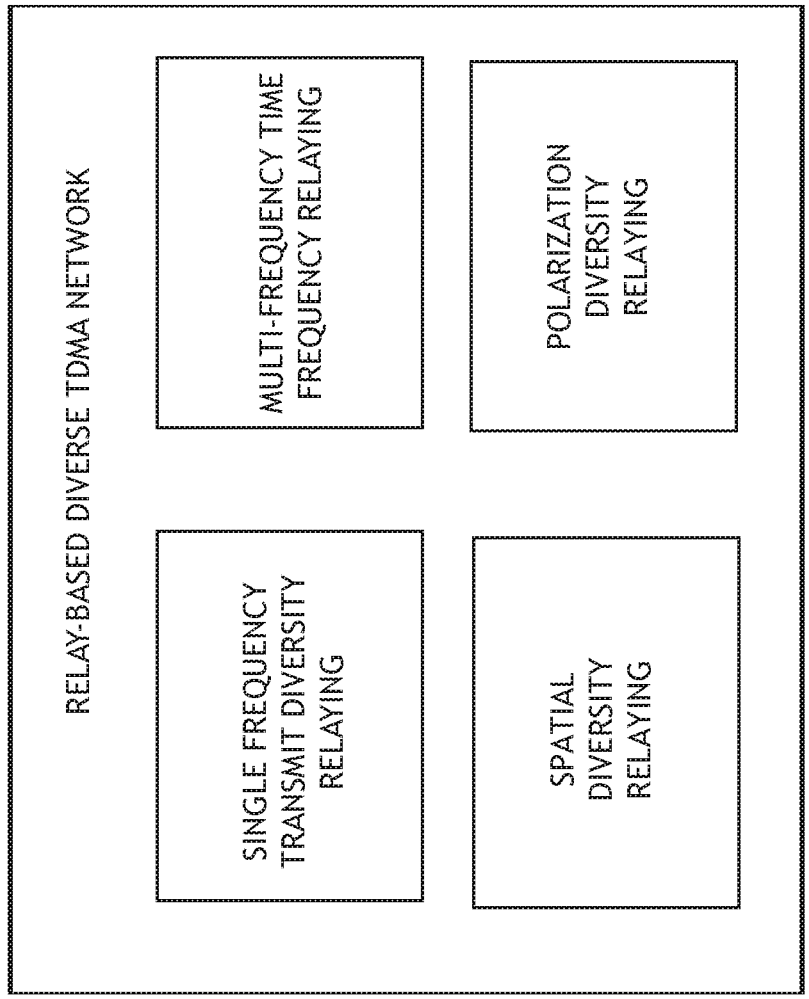
FIG. 7 is a block diagram depicting a communication system with multiple diversity components, in accordance with one or more embodiments of this disclosure.

FIG. 7 is a block diagram of a communication system 100 with multiple diversity components, in accordance with one or more embodiments of this disclosure. As noted in FIG. 6, more than one diversity scheme can be implemented at one time, as time-diverse and a frequency-diverse signals were retransmitted from relay nodes 616a-c to the destination node 112. Spatial diversity may also be incorporated into the communication system 100 along with time diversity and frequency diversity. For example, one relay node 616 may be greater than 100 feet from another relay node 616. In another example, one relay node 616 may be greater than 10 miles from another relay node 616. In another example, one relay node 616 may be greater than 100 miles from another relay node 616.

Referring again to FIG. 7, in some embodiments, the communication system 100 may include a polarization diversity scheme. For example, the communication system 100 may incorporate a frequency diverse scheme and/or time diverse scheme with a polarization diverse scheme. In other words, the communication system 100 may encompass a time diverse scheme (e.g., single frequency transmit diversity relaying), a frequency diverse scheme (e.g., multi-frequency time frequency relaying), a spatially diversity scheme (e.g., spatial diversity relaying), or a polarization diverse scheme (e.g., polarization diversity relaying). The communication system 100 may comprise one, two, three, or four diversity schemes. The communication system 100 may also comprise any combination of diversity schemes. Therefore, the description herein should not be interpreted as a limitation of the present disclosure, but merely an illustration.

The ability of the communication system 100 to use one or more diversity schemes greatly increase the probability that a transmission 108 will reach the destination node 108, even under adverse conditions. By cooperating with one or more opportunistic relay nodes 116, an originating node 104 may develop a relay transmission arrangement that will allow the one or more relay nodes 116 to utilize one or more diversity schemes to diversity the transmission 108.

It should be noted that the number of available channels used in the communication system 100 is only limited by the number of channels that may be utilized by the one or more multi-channel receivers at the destination node 112. For example, a multi-channel receiver may be capable of receiving transmissions from six channels. In another example, a multi-channel receiver may be capable of receiving transmissions from more than six channels. In another example, a multi-channel receiver may be capable of receiving transmissions from less than six channels.

Figure 8:
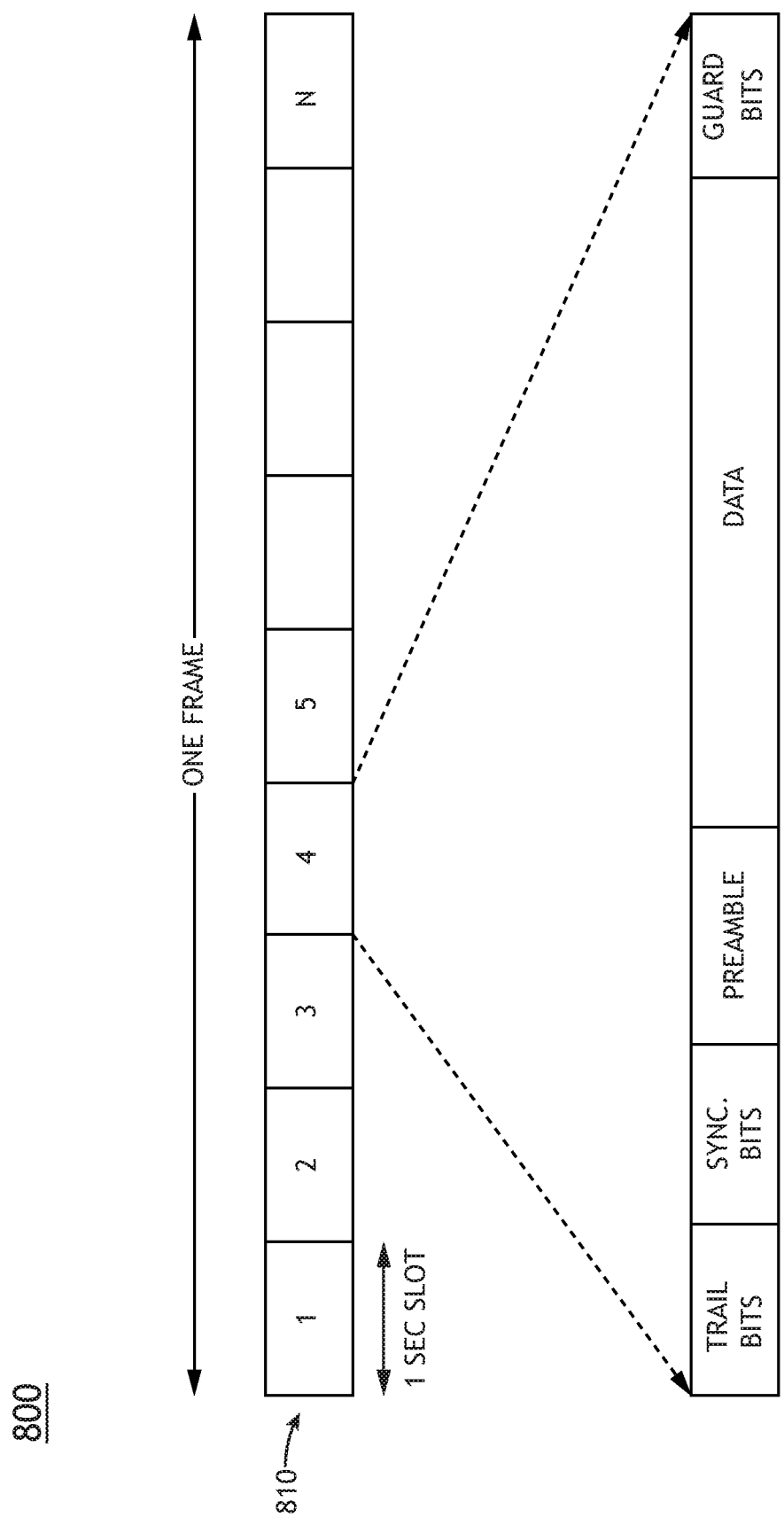
FIG. 8 is a diagram of a TDMA scheme, in accordance with one or more embodiments of this disclosure.

In some embodiments, the communication system 100 is configured for time-division multiple access (TDMA). FIG. 8 is a diagram of a TDMA scheme 800, in accordance with one or more embodiments of this disclosure. TDMA allows multiple transmissions (e.g., from one or more users) to be transmitted within one channel over the same period of time by dividing the time available for transmission into different time slots 810 that are organized within frames and dividing up a transmission to fit within each time slot 810. Each transmission in each data slot contains messaging data that is intended to be transmitted as well as control data (e.g., trail bits, synchronize bits, preamble, and guard data). Incorporated into the control data are instructions to the receiving node (e.g., relay node 116 and/or destination node 112) on how to encode and/or retransmit the data. By transmitting data within a single time slot of a frame, a portion of the message can be sent at for each frame, allowing a continuous segmented data stream to be transmitted from an originating node 104 to a destination node. In some embodiments, the relay nodes within the communication system 100 are configured to receive and retransmit TDMA transmissions.

In some embodiments, the relay nodes 116 are configured to transmit information to the destination node 112 using Space Time Block Codes (STBC). The use of STBC reduces the complexity of implementing TDMA and results in similar performance to MISO diversity reception. In some embodiments, Alamouti STBC may be implemented within the communication system 100. Other STBC codes may be implemented as well including but not limited to QOSTBC and OSTBC (e.g., real OSTBC, complex OSTBC, generalized real OSTBC and generalized complex OSTBC). In some embodiments, space time frequency block coding (STFBC) may be implemented within the communication system 100

In some embodiments, fixed-site environments like HFGCS that support split-site operation (e.g., the transmit site and receive site are separated geographically to support full duplex communication) and allow multiple transmit and receive antennas at these sites to use MISO processing techniques like beamforming to improve communication performance.

In some embodiments, the communication system 100 is configured to increase packet completion rates in time-diversity schemes (e.g., such as in point-to-point communications using STANAG 5066 protocols) through coding optimization, time slot optimization, and/or repeating slot data in one or more slots of the same TDMA frame. HF file transfer applications like STANAG 5066 generally set the SNR threshold to achieve 65% to 75% packet completion rates, as data is transmitted at a higher data rate that can be sustained by the available SNR. To increase robustness (e.g., the ability to play through 30 dB fades), legacy HF and WBHF schemes that use STANAG 5066 typically use long preambles (e.g., approximately 240 ms) and robust coding (e.g., ½ to ⅛th) to aid channel estimation. For example, a 3 MHz BPSK mode with a symbol rate of 2400 sps can deliver 105 bps (e.g., 150 bps assuming a slot completion rate of 70%). However, fades exceeding 20 dB are uncommon (e.g., less than a 10% probability and 75% of the fades are between 300 ms and one second long.

By setting the TDMA time slot to one second and incorporating a propagation guard to sustain a 5000-mile communication link, along with using a 3 kHz BPSK mode with a symbol rate of 2400 sps, a data delivery rate of 185 bps was achieved (e.g., 320 bps with a slot completion rate of 58%). By repeating the information in next slot of the same frame, the slot completion rate increased to 71% and an equivalent transfer rate to 113 bps. Similarly, by repeating the information in a slot two slots away (e.g., skipping one slot) slot completion rates of 79% are achieved. Repeating the same information more than twice increases packet completion rates, but results in bit rates below 105 bps. By optimizing packet coding, time slot length, and/or packet slot repetition, increased bit rates with desired slot completion rates are achieved.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A high-frequency beyond line of sight ad-hoc communication system comprising:

an originating node, configured to transmit a transmission, wherein the transmission is configured for skywave communication;

a destination node, configured to receive the transmission using a single destination antenna;

a plurality of relay nodes, wherein two or more relay nodes of the plurality of relay nodes are configured to directly receive the transmission from the originating node, and relay the transmission to the destination node in a time diverse manner and a frequency diverse manner, with each of the two or more relay nodes using a single antenna, each relay node comprising a controller configured to facilitate high-frequency beyond line of sight communication between the originating node and the destination node, wherein the transmission is carried in accordance with a time division multiple access (TDMA) based waveform that supports frames and time slots, wherein the frequency of the transmission is in a range of 2 MHz to 30 MHz.

2. The system of claim 1, wherein at least one of the two or more relay nodes are further configured to relay the transmission from the originating node to the destination node in a polarization diverse manner.

3. The system of claim 1, wherein the originating node is further configured to optimize at least one of packet coding or slot length to increase transmission bit rates.

4. The system of claim 1, wherein the originating node is further configured to repeat data from one time slot to another time slot within a same frame.

5. The system of claim 1, wherein at least one of the two or more relay nodes are further configured to at least one of receive a transmission from a relay node or retransmit a transmission to the relay node.

6. The system of claim 1, wherein at least one of the two or more relay nodes are further configured to perform selective interference cancellation to decode two or more simultaneous signals.

7. A high-frequency beyond line of sight ad-hoc communication system comprising:

an originating node, configured to transmit a transmission, wherein the transmission is configured for skywave communication;

a destination node, configured to receive the transmission using a single destination antenna; and a plurality of relay nodes, wherein two or more relay nodes of the plurality of relay nodes are configured to receive the transmission from the originating node, and relay the transmission to the destination node in a frequency diverse manner, with each of the two or more relay nodes using a single antenna, each relay node comprising a controller configured to facilitate high-frequency beyond line of sight communication between the originating node and the destination node, wherein the transmission is carried in accordance with a time division multiple access (TDMA) based waveform that supports frames and time slots, wherein the frequency of the transmission is in a range of 2 MHz to 30 MHz.

8. The system of claim 7, wherein at least one of the two or more relay nodes are further configured to relay the transmission from the originating node to the destination node in at least one of a time diverse or spatially diverse manner.

9. The system of claim 7, wherein at least one of the two or more relay nodes are further configured to relay the transmission from the originating node to the destination node in a polarization diverse manner.

10. The system of claim 7, wherein the originating node is further configured to optimize at least one of packet coding or slot length to increase transmission bit rates.

11. The system of claim 7, wherein the originating node is further configured to repeat data from one time slot to another time slot within a same frame.

12. The system of claim 7, wherein at least one of the two or more relay nodes are further configured to at least one of receive a transmission from a relay node or retransmit a transmission to the relay node.

13. The system of claim 7, wherein at least one of the two or more relay nodes are further configured to perform selective interference cancellation to decode two or more simultaneous signals.

14. The system of claim 7, wherein the system is further configured to utilize at least one of space-time block coding or space-time frequency block coding.

15. The system of claim 1, wherein the system utilizes a predicted propagation of HF signals to determine a selection of at least one of the two or more relay nodes.

16. The system of claim 7, wherein the system utilizes a predicted propagation of HF signals to determine a selection of at least one of the two or more relay nodes.

* * * * *